United States Patent [19]
Townsend

[11] Patent Number: 5,632,599
[45] Date of Patent: May 27, 1997

[54] TURBINE WITH CIRCUMFERENTIAL SUPPORT AND STATIONARY PRESSURE RELEASE MEANS

[75] Inventor: Neal Townsend, deceased, late of Piedmont, Calif., by C. Bruce Townsend, executor

[73] Assignee: Prime Energy Corporation, Gardenerville, Nev.

[21] Appl. No.: 657,169

[22] Filed: Jun. 3, 1996

[51] Int. Cl.⁶ ........................................................ F03D 7/04
[52] U.S. Cl. .......................................... 416/42; 416/DIG. 6
[58] Field of Search .......................... 416/41, 42, 169 R, 416/170 R, 178, 187, DIG. 4, DIG. 6; 415/2.1, 4.1, 4.3, 4.5

[56] References Cited

U.S. PATENT DOCUMENTS

| 1,536,968 | 5/1925 | Palm | 416/DIG. 6 |
| 4,168,439 | 9/1979 | Palma | 416/DIG. 6 |
| 5,425,619 | 6/1995 | Aylor | 416/42 |

FOREIGN PATENT DOCUMENTS

| 745869 | 5/1933 | France | 416/DIG. 6 |
| 3222007 | 12/1963 | Germany | 416/DIG. 6 |
| 1231251 | 5/1986 | U.S.S.R. | 416/DIG. 6 |

Primary Examiner—John T. Kwon
Attorney, Agent, or Firm—Charles F. Schroeder

[57] ABSTRACT

A wind energy turbine having air driven blades peripherally distributed about a horizontal rotational axis forming an interior region in which air pressures built up by wind introduced thereto are released through the spaces between the blades. A stationary back wall for the rotor includes biased air outlet gates for auxiliary release of high internal air pressures thereby limiting and governing rotational speed of the turbine such as in high storm winds. The rotor is rotatably supported by rollers on a pair of parallel stationary rings which act as tracks for the rotor. The entire rotor support assembly is mounted on a platform pivotable about a vertical axis by an associated wind vane arrangement for directing the turbine entry into oncoming winds.

18 Claims, 5 Drawing Sheets

TURBINE WITH CIRCUMFERENTIAL SUPPORT AND STATIONARY PRESSURE RELEASE MEANS

BACKGROUND OF THE INVENTION

The present invention is a turbine type wind energy converter and more particularly a wind driven turbine having a frontal air inlet and air outlets between side-by-side circumferentially distributed blades.

Wind turbines incorporating a rotor with side-by-side blades about an interior region into which air is introduced for release between blades to drive the rotor have been disclosed in prior patents issued to Elmo E. Aylor, namely U.S. Pat. No. 4,781,523 issued Nov. 1, 1988 and U.S. Pat. No. 5,425,619 issued Jun. 20, 1995 in each of which the rotor is supported on a central shaft about which it rotates. In a co-pending application Ser. No. 08/417,813 a similarly related rotor has been disclosed which is supported on rollers in a base region and having excessive pressure release gates in the back wall which rotate with the rotor and are operated with the assistance of centrifugal force.

The turbine may optionally have a central shaft at its axis not for support of the rotor but adaptable for takeoff of power from the rotor. However, as the diameter of the rotor increases to large sizes, for example to a diameter of 60 to 80 feet, the torque at the central shaft will reach enormous and less practical magnitudes while the rotational speed of the rotor diminishes by a given horsepower output.

Although the angular speed of rotation of a large diameter turbine may be less than that of a small diameter turbine receiving the same fluid power input, the linear outer peripheral speeds of the large diameter rotor are comparable to the outer peripheral speed of the smaller diameter turbine receiving the same fluid power input.

BRIEF SUMMARY OF THE INVENTION

According to the present invention a wind turbine is disclosed having a rotor with side-by-side blades about an interior region supported between two parallel stationary rings which act as tracks between which the rotor rotates on circumferentially distributed rollers which engage the tracks.

Power takeoff from the turbine can be accomplished by arranging for the peripheral speed of the rotor to be converted to drive power for one or more electric generators each driven by roller means having a connecting or contacting association with means adapted to translating the outer peripheral speed of the large rotor to rotational speed of a generator.

The entire turbine assembly is mounted on a platform which is angularly movable about a vertical axis and having a wind vane structure arranged to direct the turbine entry in the direction of the wind to allow entry of wind air into the rotor interior for driving release between the blades.

The back wall of the turbine opposite the entry is formed of a stationary structure which blocks the flow of wind through the rotor and directs it to the openings between the blades. The stationary back wall incorporates pivotable gates biased to cause the gates to open when a predetermined excess of wind pressure is presented in the rotor interior due to high velocity winds, thereby making the turbine assembly generally self governing in rotational speed.

An object of the invention is to provide a stable support system for the rotor including stationary circular tracks and rollers peripherally positioned on the rotor to engage the tracks in rotational supported relationship.

Still another object of the invention is to reduce the number of moving parts required in the turbine assembly to effect release of excess pressure in the rotor interior for speed governance.

A further object of the invention is to provide a non-rotating system for release of excess pressure from within a rotating wind driven rotor.

DETAILED DESCRIPTION OF THE DRAWINGS

Figure 1:
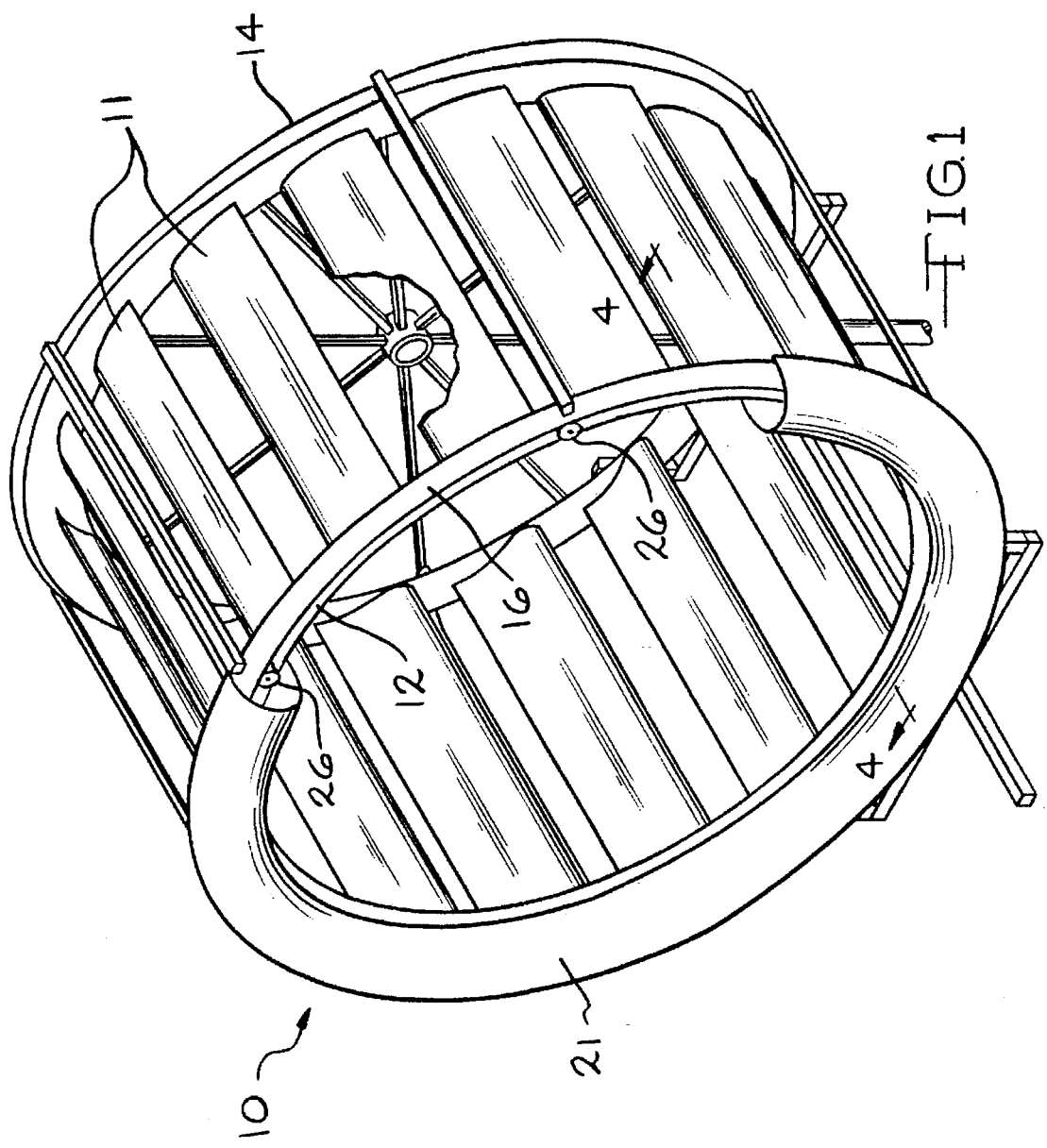
FIG. 1 is an over-all partially broken away perspective view of an air driven turbine of the present invention as viewed from the front entry side of the turbine.
Figure 2:
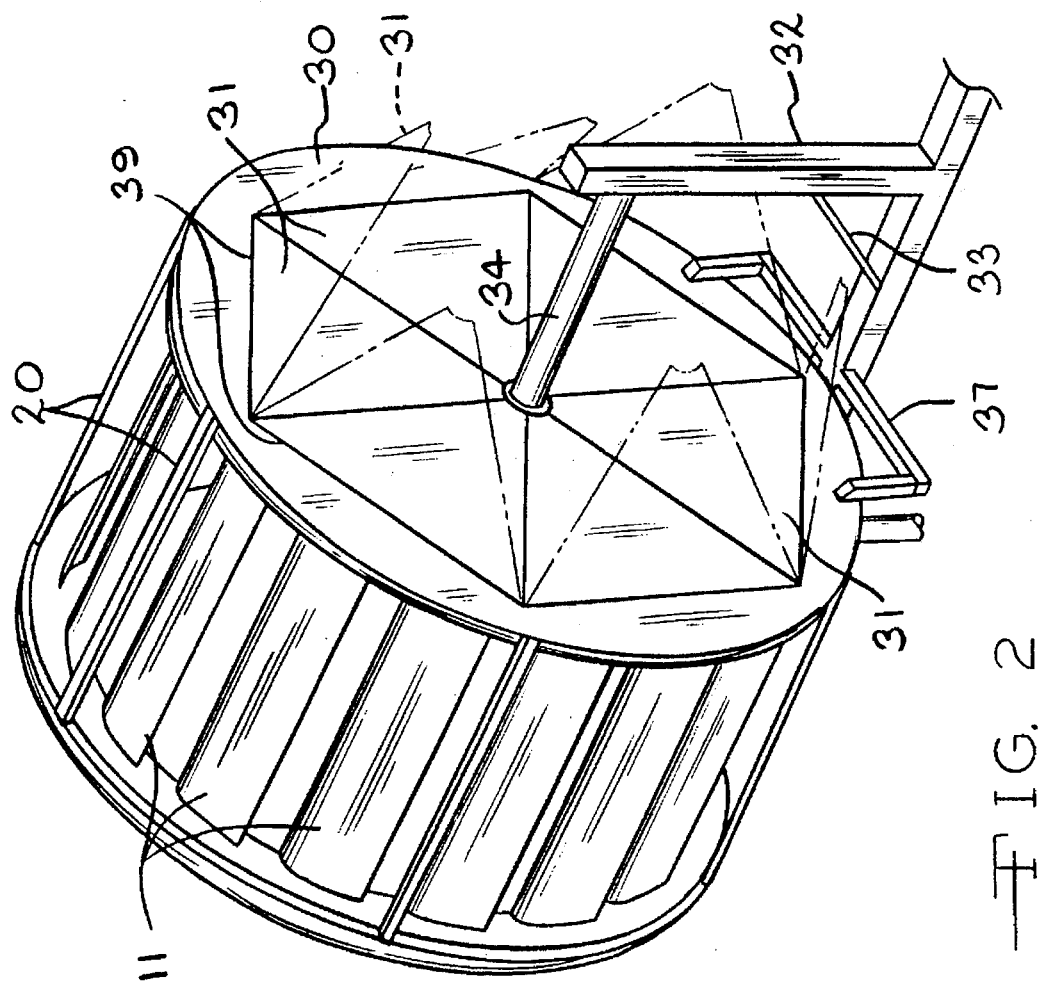
FIG. 2 is a generalized perspective view of the back side of the air driven turbine of FIG. 1 showing the stationary back wall of the turbine with excess pressure gates therein.

Turning to the drawings in greater detail, FIG. 1 illustrates a turbine rotor 10 having side-by-side blades 11 spaced circumferentially about the rotor interior by being mounted between a pair of spaced rotatable circular support bands, namely a front support band 12 and a rear support band 14. Concentric with and immediately adjacent each of the spaced support bands 12 and 14 are a pair of spaced circular support rings or tracks, namely a front support track 16 and a rear support track 18 engaged by rollers 26 and 28. The rollers are mounted at the front side of the rotor on the front band 12 and the rollers 28 on the rear side of the rotor on the rear support band 14 as may be seen more clearly in FIG. 4. The front and rear tracks 16 and 18, as illustrated, can be tubular in construction and the rollers on the rotor are each shaped with a groove of configuration matched to engage and hold them in association with the circular cross sectional shape of the tubes as they rotate on the tracks.

A number of structurally reinforcing cross brackets 20 spaced about the circumference of the rotor each extend between the front track 16 and the rear track 18 to provide structural strength for the stationary portions of the rotor. An entry ring 21 at the front of the rotor is contoured aerodynamically to promote a smooth flow of air into the rotor interior for release from spaces between the blades 11. Rotation of the rotor is thereby effected under the influence of the continuum of wind air flowing into the rotor which establishes a pressure for air release from between the blades.

Radial support members 35 at the back of the rotor provide support for the stationary back wall 30 of the rotor. Each of the radial members 35 extends from the rear support band 14 to the center of the back wall. A horizontal shaft 34 which provides additional support for the back wall extends from the upper region of a vertical back support member 32 braced by a member 33 at its base. The vertical member 32 projects upwardly from an underlying support frame 37 for the stationary back wall 30 of the rotor. The stationary back wall 30 of the rotor 10 is located sufficiently close to the rotor rear support band 14 to assure minimum or no release of air from between the rotor and the back wall.

The back wall 30 of the rotor includes a series of side-by-side gates 31 each of which is generally triangular in shape extending to an apex region at the center of the rotor, to which the horizontal support shaft 34 extends. Each of the excess pressure release gates 31 is pivotable about its own base region located near the outer periphery of the rotor. The gates are weighted to provide a self biasing action to hold them normally closed such that when predetermined excesses of air pressure within the rotor occur that the gates are pushed open. This biasing action can be assisted by additional weights and by spring members in the base of the triangular shaped gate which can be made adjustable in their biasing action so as to permit establishment of the degree of biasing action desired for wind conditions confronted. Each is openable under excess pressure within the rotor by its being capable of swinging out from about its base 39 with the apex of the triangle swinging outward to in effect open the gate for release of air from the rotor interior. The gates may be arranged to be opened individually under such excess pressure or in coordinated fashion by interconnection so that they open in unison generally about the same distance outwardly for release of excess air pressure through the central region of the back 30. The gates can be arranged to be opened singly or together progressively to different degrees responsive to different levels of excess pressure in the rotor. In this regard they might be arranged so that alternate gates are opened first and as high winds occur, all will open together.

Figure 3:
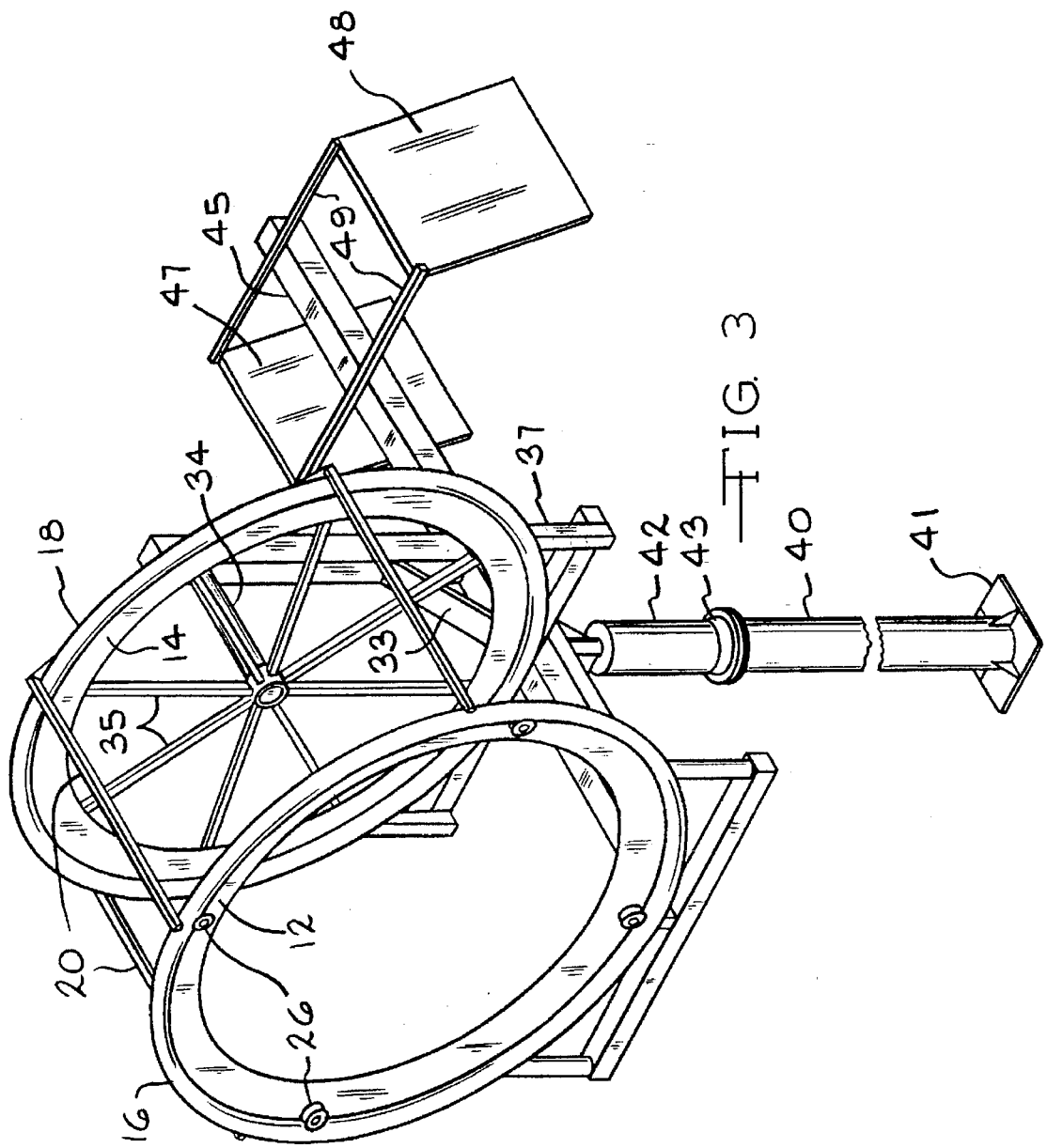
FIG. 3 is a structural view of the framework of the turbine of FIGS. 1 and 2 showing the stationary tracks on opposite sides thereof engaged by supporting rollers peripherally distributed about both sides of the turbine rotor and the entire assembly mounted on a wind directional platform.

FIG. 3 illustrates more clearly the skeletal frame arrangement for the rotor with the blades 11 removed. Shown in this figure is the general arrangement by which the rotor entry can be turned to face the wind. The front rotatable support band 12 for the rotor has a series of rollers 26 spaced about its circumference for engagement with the stationary front track 16. The track 16 is tied by way of cross braces 20 to the stationary back track 18. Support rollers 28, not visible in this figure, are mounted on the back side of the rotatable flange 14 of the rotor and engage the interior side of the track 18. Thus the bladed rotor is made rotatable within the tracks 16 and 18 without the need for a central shaft for the rotor. For this reason the rotor can be made much larger than conventional wind driven turbines rotatable on a horizontal axis in that the rotor is supported peripherally rather than centrally.

The entire rotor assembly is mounted on a framework 37 which acts as a platform which in turn is mounted on a vertical rotatable shaft 42 supported in a bearing 43 at the top of a mounting post 40 having a base 41. The platform acting frame 37 has an extended channel 45 extending beyond the back of the rotor which is provided with wind vanes 47 and 48 mounted to effect a directional orientation of the framework so that the entry to the rotor will face oncoming winds. A pair of cross-members 49 are affixed to the extended support channel 45 to hold the vanes 47 and 48 in fixed relation to each other so that wind passing over the vanes will exert forces to orient the support frame.

Figure 4:
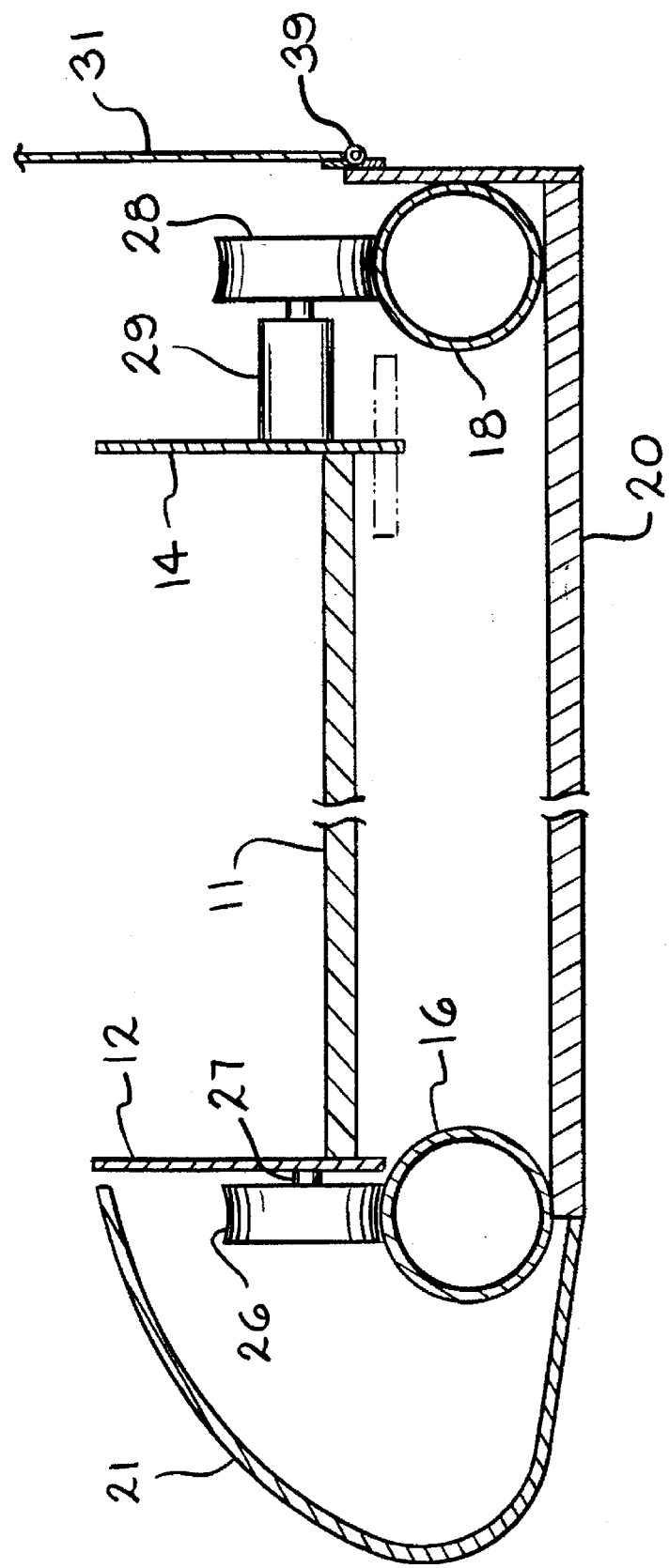
FIG. 4 is an enlarged cross-sectional view of a portion of the rotor of FIG. 1 as taken on line 4—4 with support rolls mounted thereon and arranged to engage tracks on opposite sides with an aerodynamically shaped outer entry cover over the front track.

FIG. 4 illustrates how the front rollers 26 and the front track 16 engaged thereby are covered by an aerodynamically shaped entry ring 21. This figure further shows how the rotor blades 11 illustrated in broken away sectional form are mounted between the front and rear rotatable bands 12 and 14 respectively of the rotor. The rollers 26 are mounted on shafts 27 affixed to the front band 12 of the rotor while rollers 28 are mounted on slightly longer roller shafts 29 connected to the rear band 14 of the rotor.

Figure 5:
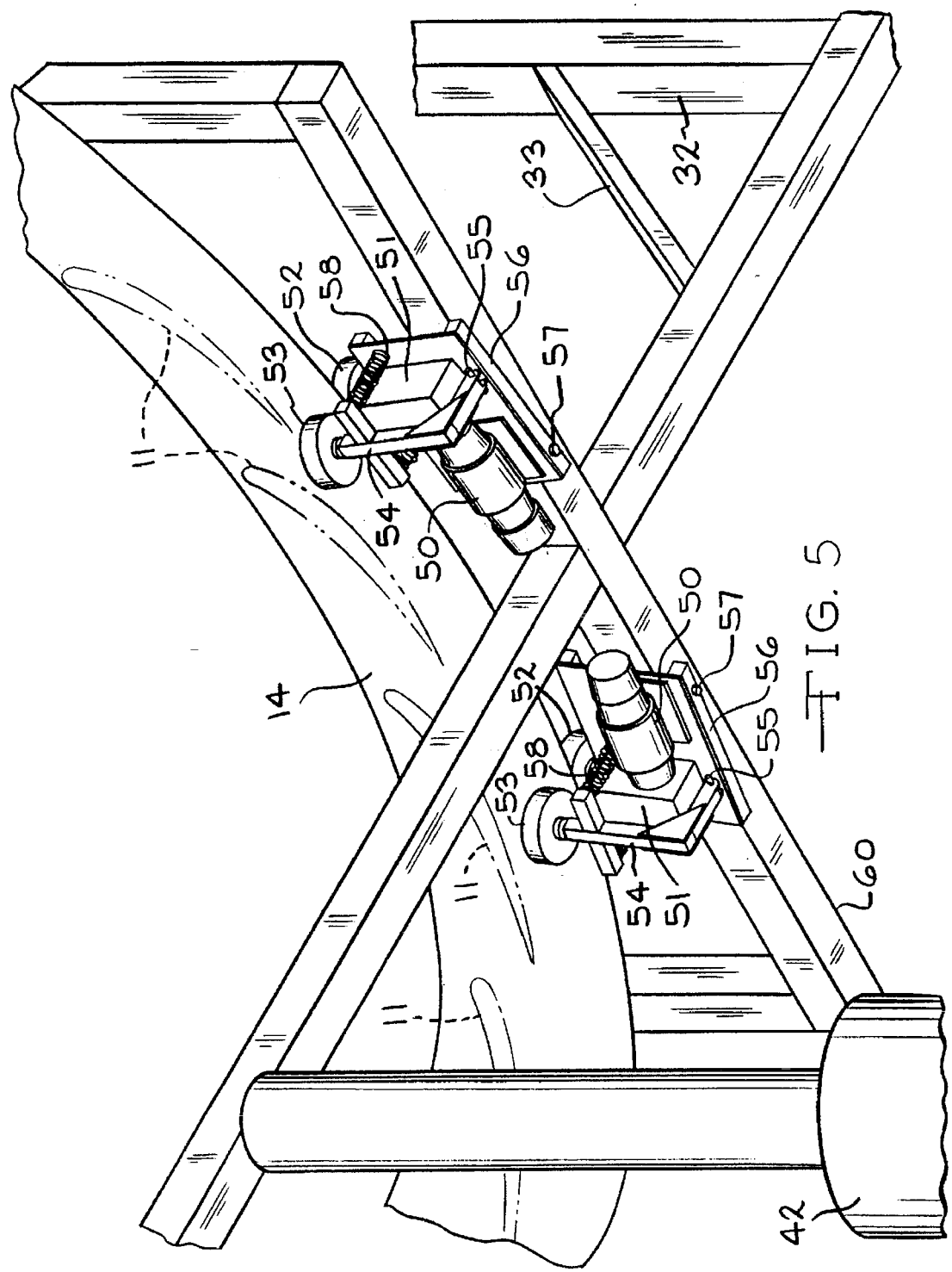
FIG. 5 is an illustration of a portion of the rotor of FIGS. 1–3 illustrating a frictional drive assembly associated therewith arranged to drive electric generators.

FIG. 5 illustrates the manner in which generators 50 for conversion of the mechanical energy of the rotor to electrical energy can be driven by the rotor. In this regard each of the generators 50 is mounted on a bracket 56 which is moveable up and down at one end about a pivot shaft 57 at the other end. A drive roll 52 connected to the generator engages the edge or flange of a blade support band which in this illustration is the rear support band 14. The drive roll 52 is maintained in forceful contact with the flange under the influence of a pinch roll 53 on the opposite side of the support band 14, the pinching action being provided by biasing means exemplified by a spring 58 extending from the bracket 56 to an angular pivot arm 54 on which the pinch roll 53 is mounted. The drive roll 52 is connected directly to a gear box 51 to translate the peripheral speed of the flange 14 in proper ratio relationship to the generator speed which will produce the voltage output from the generator 50. The angular pivot arm 54 is moveable about a pivot 55 at the end of the pivot arm opposite that of the pinch roll 53 thereby providing a smooth pinching association of the drive roll with the flange 14.

A number of such generators 50 can be mounted in association with the rotor in this manner and mechanical disconnects not shown, can be provided in association with the drive and pinch rolls to disengage any one or more of the generators as load requirements dictate. The generators can be electrically connected to provide a combined regulated electric power output. As further illustrated in FIG. 5 such generator assemblies can be mounted on support bars 60 associated with the back support frame 37. Thus electrical outputs from the rotor can be controlled both by automatic speed regulation by the action of the excess pressure gates 31 and by the number of generators connected to the rotor at any one time. Correspondingly by electrical disconnection or connection of any one or more generators with the system in which they are connected can be arranged to be accomplished automatically as wind power changes. Still further, the support system can include drive roll means interconnecting the roll and the support ring on one side while the other side is provided with alternate moveable support means.

In view of the foregoing it will be understood that many variations of the arrangement of the invention can be provided within the broad scope of principles embodied therein. Thus while a particular preferred embodiment of the invention has been shown and described, it is intended by the appended claims to cover all such modifications which fall within the true spirit and scope of the invention.

It is claimed:

1. An air driven turbine comprising a rotor, including a plurality of side-by-side spaced air engaging blades to drive said rotor, said air engaging blades surrounding and defining an interior of said rotor, said rotor having a front side and an opposite back side, said rotor front side having an inlet for receipt of air to said interior for release through spaces between said blades, said back side comprising a stationary back wall arranged in close proximity with said back side to block air flow from said back side of the rotor and to minimize possibility of undesired air release from said rotor interior, said stationary back wall including normally closed auxiliary air outlet gates arranged to open to release air from said interior responsive to predetermined excesses in air pressure within said rotor.

2. An air driven turbine as set forth in claim 1 in which said gates are weighted to provide a self biasing action for release of predetermined excesses in air pressure within said rotor.

3. An air driven turbine as set forth in claim 1 including biasing means associated with said gates for holding said gates normally closed.

4. An air driven turbine as set forth in claim 3 in which said biasing means for said gates comprise spring means associated with each of said gates.

5. An air driven turbine comprising a horizontal axis rotor including a plurality of side-by-side air engaging blades to drive said rotor, said air engaging blades surrounding an interior region of said rotor with said interior region having an inlet for receipt of air and release from said region through spaces between said blades, a support assembly for said rotor comprising a pair of parallel circular concentric support rings stationarily spaced from each other with said rotor disposed in concentric relation therebetween, means for support of said rotor in rotational relation on said support rings.

6. An air driven turbine as set forth in claim 5 in which said means for rotational support of said rotor comprises a series of rolls circumferentially distributed on at least one side of said rotor arranged for supporting engagement of said one side of said rotor in rotational relation with a respective one of said tracks on said one side of said rotor.

7. An air driven turbine as set forth in claim 5 in which said means for rotational support of said rotor comprises rolls circumferentially distributed on opposite sides of said rotor arranged for rotational supporting association of said rotor with said rings.

8. An air driven turbine comprising a rotor having a generally horizontal axis of rotation, said rotor having a front portion providing a circular front face for said rotor and a back portion parallel to and spaced from said front portion providing an open circular back face for said rotor, a plurality of blades distributed in spaced side-by-side relation extending between said front and back portions about said axis of rotation, said distributed blades defining an interior of said rotor, said front face having an entry opening for air flow into said rotor interior for release from between said blades, said blades across their width being shaped and angularly pitched to the flow of air therebetween to effect rotation of said rotor, a system of support for said rotor including a pair of stationary circular rotor-support rings concentric with said axis of rotation, each of said rings being located near one of said rotor faces near the outer circumferential edge of the respective face with which it is associated, a series of rolls on both the front and back portions of said rotor and interassociated with said rotor and rings arranged for rotational support of said rotor on said rings.

9. An air driven turbine as set forth in claim 8 in which said rolls are distributed circumferentially about both faces of said rotor.

10. An air driven turbine as set forth in claim 8 in which said back portion includes a stationary back wall in close proximity over said open back face of said rotor.

11. An air driven turbine as set forth in claim 9 in which said stationary back face for said rotor includes normally closed air outlet means arranged to open for release of air from said interior responsive to predetermined excesses in air pressure within said rotor.

12. An air driven turbine as set forth in claim 11 in which said air outlet means comprise at least one gate openable progressively to different degrees responsive to different levels of excess pressure in said rotor.

13. An air driven turbine as set forth in claim 8 in which a continuous circumferential based surface is provided with at least one of said rotor positions which rotates with said rotor and at least one electric generator having an associated drive roll means which makes driving contact with said band surface to translate the rotation of said rotor to electric energy.

14. An air driven turbine as set forth in claim 13 in which said generator drive roll means includes a biased pinch roll making contact with said band surface arranged to draw said drive roll means into forceful contact with said band.

15. An air driven turbine as set forth in claim 13 in which a plurality of generators each having a drive roll which makes contact with said band surface is driven to translate rotation of said rotor to electric energy.

16. An air driven turbine as set forth in claim 8 in which a separate continuous circumferential band surface is provided with each of said rotor portions and electric generators each having a drive roll arranged to make a driving contact with one of said band surfaces to translate rotation of said rotor to electric energy.

17. An air driven turbine as set forth in claim 16 in which said generators are electrically connected together to produce a combined electric output.

18. An air driven turbine as set forth in claim 16 in which each of said generators is provided with means for mechanically disengaging the generator from driving contact with its respectively contacted band surface.

* * * * *